United States Patent
Pati et al.

(10) Patent No.: US 10,902,688 B2
(45) Date of Patent: *Jan. 26, 2021

(54) SYSTEM AND METHOD FOR DETERMINING GRADE ERRORS OF A ROUTE

(71) Applicant: GE Global Sourcing LLC, Norwalk, CT (US)

(72) Inventors: Dibyajyoti Pati, Bangalore (IN); Ashish Anil Paralikar, Bangalore (IN); Mohankumar Nanjegowda, Bangalore (IN); Prakarsh Paritosh, Bangalore (IN)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 69 days.

This patent is subject to a terminal disclaimer.

(21) Appl. No.: 15/959,264

(22) Filed: Apr. 22, 2018

(65) Prior Publication Data

US 2018/0240289 A1 Aug. 23, 2018

Related U.S. Application Data

(63) Continuation of application No. 15/146,715, filed on May 4, 2016, now Pat. No. 9,953,472.

(51) Int. Cl.
| | |
|---|---|
| *G07C 5/08* | (2006.01) |
| *G07C 5/00* | (2006.01) |
| *B60W 30/18* | (2012.01) |
| *B60W 50/00* | (2006.01) |
| *G01C 21/00* | (2006.01) |

(Continued)

(52) U.S. Cl.
CPC ........... *G07C 5/0808* (2013.01); *B60W 30/18* (2013.01); *B60W 50/0097* (2013.01); *G01C 21/00* (2013.01); *G07C 5/008* (2013.01); *B60W 40/076* (2013.01); *B60W 2552/15* (2020.02);

(Continued)

(58) Field of Classification Search
CPC ........ G07C 5/0808; G07C 5/00; G07C 5/008; G07C 2209/02; G07C 9/00896; G07C 5/0825; B60W 30/18; B60W 50/0097; B60W 2550/402; B60W 2710/20; B60W 10/20; B60W 20/12; B60W 30/12; B60W 30/18163; B60W 30/09; B60W 30/00; G05D 1/0088; G05D 2201/0213; G05D 1/0221

See application file for complete search history.

(56) References Cited

U.S. PATENT DOCUMENTS 5,832,400 A * 11/1998 Takahashi ......... B60W 30/1819
701/53
6,847,887 B1 * 1/2005 Casino ................... G01C 21/32
340/995.18

(Continued)

*Primary Examiner* — Hunter B Lonsberry
*Assistant Examiner* — Luis A Martinez Borrero
(74) *Attorney, Agent, or Firm* — Mary D. Lawlor; The Small Patent Law Group LLC

(57) ABSTRACT

A system includes a vehicle system that is operating in accordance with the operational settings of a trip plan. The operational settings dictate how the vehicle system is to travel at different locations along the route. A processor of the system may identify differences between the operational settings of the trip plan and the operational settings at which the vehicle actually travels. The processor may further identify whether the differences are caused by a grade error.

20 Claims, 7 Drawing Sheets

(51) Int. Cl.
*G01C 7/04* (2006.01)
*B60W 40/076* (2012.01)

(52) U.S. Cl.
CPC ... *B60W 2556/50* (2020.02); *B60W 2720/103* (2013.01); *G01C 7/04* (2013.01)

(56) References Cited

U.S. PATENT DOCUMENTS

| | | | | |
|---|---|---|---|---|
| 8,775,037 B2* | 7/2014 | Kato | .................. | B60W 30/192 701/54 |
| 9,205,759 B2* | 12/2015 | Pulliam | .................. | B60L 50/51 |
| 9,669,851 B2* | 6/2017 | Cooper | ................ | B61L 23/044 |
| 9,751,542 B2* | 9/2017 | Pulliam | .................... | B61C 3/00 |
| 9,953,472 B2* | 4/2018 | Pati | ..................... | G07C 5/0808 |
| 10,053,120 B2* | 8/2018 | Brooks | ............... | B60L 15/2045 |
| 10,183,684 B2* | 1/2019 | Mathews, Jr. | .......... | B61L 3/006 |
| 10,246,111 B2* | 4/2019 | Brooks | ............... | B61L 15/0009 |
| 10,457,281 B2* | 10/2019 | Brooks | ................. | B61C 17/12 |
| 10,551,842 B2* | 2/2020 | Lonari | ............. | B60W 50/0097 |
| 2011/0276209 A1* | 11/2011 | Suganuma | ............. | B60W 10/06 701/22 |
| 2012/0197497 A1* | 8/2012 | Kato | ..................... | B60W 30/18 701/48 |
| 2014/0277860 A1* | 9/2014 | Pulliam | ................... | B60L 3/106 701/19 |
| 2015/0193992 A1* | 7/2015 | Kumar | ..................... | B61K 9/12 701/29.2 |
| 2016/0257309 A1* | 9/2016 | Kumar | ................ | B60W 30/143 |
| 2016/0318532 A1* | 11/2016 | Brooks | ............... | B61L 27/0027 |
| 2017/0282942 A1* | 10/2017 | Mathews, Jr. | .......... | B61L 3/008 |
| 2017/0323495 A1* | 11/2017 | Pati | ......................... | G01C 21/00 |
| 2018/0215400 A1* | 8/2018 | Agrawal | ............... | B61L 23/044 |
| 2018/0222502 A1* | 8/2018 | Paralikar | ............... | B61C 15/14 |
| 2018/0313282 A1* | 11/2018 | Pati | ....................... | G05D 1/0293 |
| 2018/0314255 A1* | 11/2018 | Nistler | .................. | G01M 17/08 |
| 2018/0322791 A1* | 11/2018 | Brooks | .................... | G08G 1/22 |
| 2019/0056234 A1* | 2/2019 | Lin | ....................... | G01C 21/265 |
| 2019/0066406 A1* | 2/2019 | Sarwar | ..................... | G07C 5/085 |
| 2019/0156600 A1* | 5/2019 | Potyrailo | ............... | B61C 17/08 |
| 2019/0193759 A1* | 6/2019 | Ravi | ...................... | B61L 3/006 |
| 2019/0225245 A1* | 7/2019 | Kulkarni | ............. | G01C 21/3453 |
| 2019/0318553 A1* | 10/2019 | Pati | .................. | B60W 50/0097 |
| 2020/0047781 A1* | 2/2020 | Worden | .................. | B61C 15/08 |
| 2020/0070863 A1* | 3/2020 | Kumar | ..................... | B61C 5/00 |
| 2020/0139995 A1* | 5/2020 | Loch | .................... | G07C 5/0808 |

* cited by examiner

SYSTEM AND METHOD FOR DETERMINING GRADE ERRORS OF A ROUTE

CROSS-REFERENCE TO RELATED APPLICATIONS

This application is a continuation of U.S. patent application Ser. No. 15/146,715 filed 4 May 2016, which is incorporated herein by reference.

TECHNICAL FIELD

Embodiments of the subject matter described herein relate to a system that identifies errors in route grades and/or damaged routes.

BACKGROUND

Vehicle systems, such as automobiles, mining equipment, rail vehicles, over-the-road truck fleets, and the like, may operate according to a predetermined trip plan. The trip plan may designate speeds or power settings of the vehicle system. Travel according to the trip plan can reduce fuel consumption and/or emission generation by the vehicle system.

The trip plan may be based on a variety of data, such as weight of the vehicle system, grades of the route, or other information. If some of this data is erroneous, however, the vehicle system may not travel efficiently (e.g., may consume more fuel and/or generate more emissions than the trip plan). For example, the trip plan may be based on incorrect grades of the route, where the actual grade is steeper or less steep than the grade on which the trip plan is based. By traveling at operational settings of a trip plan that are based on incorrect grades, the vehicle system may produce more emissions, consume more fuel, have a delayed arrival to the end destination, travel at speeds that exceed speed limits, and the like.

BRIEF DESCRIPTION

In one embodiment of the subject matter described herein, a system is provided that includes a vehicle that is operating in accordance with the operational settings of a trip plan. The operational settings dictate how the vehicle system is to travel at different locations along the route. A processor of the system may identify differences between the operational settings of the trip plan and the operational settings at which the vehicle actually travels. The processor may further identify whether the differences are caused by a grade error.

In one embodiment, a method (e.g., for examining a route) includes determining the designated operational settings for a vehicle to travel according to a trip plan. The trip plan dictates the designated power settings and the designated speed settings of the vehicle at different locations along the route. The method includes identifying differences between the operational settings of the trip plan and the vehicle-controlled operational settings at which the vehicle travels. The differences identify grade errors between the designated grade of the trip plan and the actual grade of the route that the vehicle travels.

In one embodiment, a system is provided that includes a vehicle that is operating in accordance with the operational settings of a trip plan. The designated operational settings of the trip plan dictate how the vehicle system is to travel at different locations along a route. A processor of the system may identify differences between the designated operational settings of the trip plan and the operational settings at which the vehicle actually travels. The processor may further determine a route health index based on the differences that is representative of the extent of damage to the route.

BRIEF DESCRIPTION OF THE DRAWINGS

The subject matter described herein may be understood from reading the following description of non-limiting embodiments, with reference to the attached drawings, wherein.

DETAILED DESCRIPTION

One of more embodiments of the inventive subject matter described herein relate to systems and methods that identify differences between vehicle designated power settings of a trip plan and vehicle-controlled power settings to determine differences between the designated grade of the route and actual grades of the route. Optionally, the designated power settings may be used to determine the health of the route. The systems and methods compare the designated power settings and the vehicle-controlled powers settings to identify errors in grades along the route. The grade error locations can be used to determine whether the grade error is a positive grade error or a negative grade error, as well as the amount of correction that should be applied to the designated power settings of the trip plan to cause a vehicle to move toward a designated speed of the trip plan.

The systems and methods can be used to determine discrepancies between the designated grades of the route of the trip plan and the actual grades of the route. Based on the discrepancies that are determined, the systems and methods can further schedule inspection of the route, modify the trip plan during movement of the vehicle along the route, and can update the designated grades of the route based on one or more differences between the designated power settings of the trip plan and the vehicle-controlled power settings. The systems and methods described herein can be used to improve trip efficiency. The systems and methods can further be used to determine a route "health" factor to categorize the state of the route.

Figure 1:
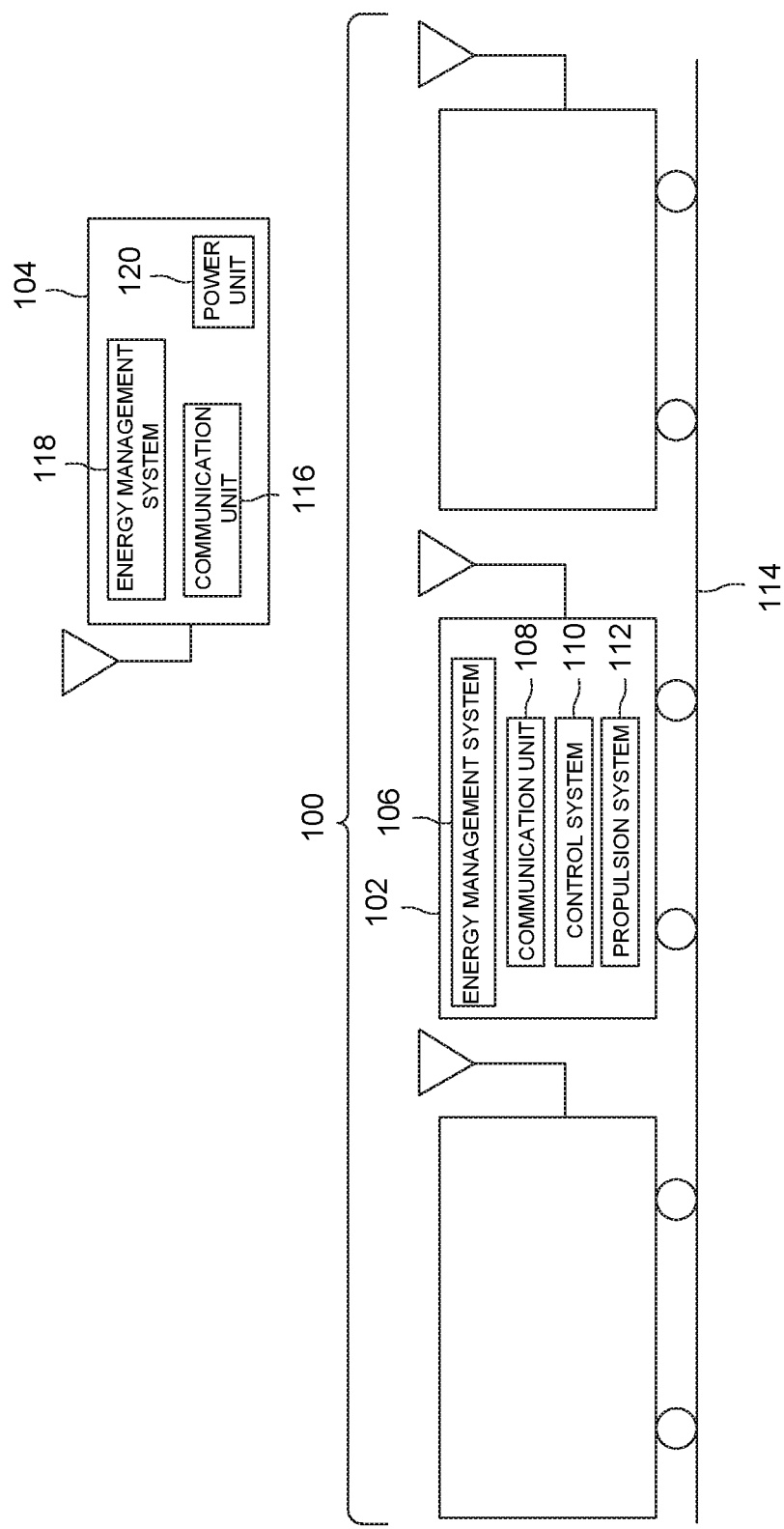
FIG. 1 is a schematic illustration of a vehicle system according to one example of the inventive subject matter.

FIG. 1 illustrates one example of a vehicle system 100 and a communication system 104. The vehicle system 100 may be formed from a single vehicle 102, or two or more vehicles traveling together along a route. The vehicles may or may not be mechanically coupled with each other. The vehicles may be propulsion-generating vehicles (e.g., locomotives, automobiles, other freight or passenger rail vehicles, or rail-based ore carts or other mining equipment) and/or non-propulsion-generating vehicles (e.g., rail cars, trailers, barges, mining baskets, etc). The illustrated vehicle system 100 represents a rail vehicle system, such as a train. But, the vehicles may be other off-highway vehicles (e.g., electric mine haul trucks or heavy construction equipment), marine vessels, and/or other vehicles generally. The vehicle system travels along a route 114, which can represent a track, road, waterway, or the like.

The communication system 104 may include several devices (also referred to as components), that may communicate with each other and/or among each other according to one embodiment. For example, the devices may include a power unit 120, communications unit 116, an energy management system 118, or the like. The power unit 120 may provide electrical power to the vehicle system 100. Additionally or alternatively, the power unit 120 may power the communications system 104. For example, the power unit 120 may be a battery and/or circuitry that supplies electric current to power other components. The communications unit 116 may enable communication between the vehicle system 100 and the communications system 104 using transceiver circuitry, and hardware such as a wireless antenna. The energy management system 118 may perform a number of functions for the communication system 104. For example, the energy management system 118 may determine an estimated trip load, determine an amount of available energy of the power unit, transmit a request signal via the communications unit to the vehicle system 100, or the like.

The communication system 104 communicates data between various devices that may be onboard and/or off-board the vehicle system 100. The communication system 104 can receive data signals (e.g., wireless data signals) from off-board wayside devices, such as roadside transponders, signals, sensor systems (e.g., hotbox detectors), positive train control transponders, etc. The off-board communication system may receive data signals from other off-board devices, such as satellites, wireless devices (e.g., cellular phones, computers, remote controls, etc.), a dispatch tower, or other locations.

The devices shown onboard vehicle 102 may be disposed onboard a single vehicle 102 of the vehicle system 100 or optionally may be distributed among two or more vehicles 102 of the vehicle system 100. Different devices onboard the vehicle 102 may communicate with and/or among each other to control operations of the vehicle system 100. For example, devices onboard the vehicle system 100 may communicate with each other to control tractive efforts produced by the vehicle system 100. Additionally or alternatively the devices onboard the vehicle system may communicate with each other to control braking efforts produced by the vehicle system 100. Additionally or alternatively the devices may communicate with each other to coordinate operations performed by the same type and/or different types of devices onboard the same and/or different vehicles 102 in the vehicle system 100. Additionally or alternatively the devices onboard the vehicle system may also communicate with each other to display information from one or more components onboard one vehicle 102 on a display device on the same or different vehicles 102, etc.

An energy management system 106 ("EMS") is a device onboard the vehicle system 100. Alternatively, the EMS 106 may be off-board the vehicle system. The EMS 106 may determine a trip plan to be used in controlling movement of vehicle system 100. The trip plan may also be communicated from the off-board communication system 104, onboard from the vehicle system 100, off-board dispatch centers, other communication locations, or the like. The trip plan includes designated operational settings of the vehicle system 100 to dictate how the vehicle system 100 is to travel along the route 114 based on the designated grades of the route. The designated operational settings may include designated power settings, acceleration settings, designated speeds, velocity settings, throttle settings, brake settings, or the like, that control the vehicle system 100 as the vehicle system travels along the route. The operational settings of the trip plan may be designated as a function of time and/or distance of the route based on the designated grades of the route. Benefits of the vehicle system 100 traveling according to the designated operational settings of the trip plan include reduced fuel consumption, reduced emissions generation by the vehicle system, improved handling of the vehicle system, the vehicle system arriving at a designated location within a designated time period and/or at a designated time, control of vehicle speed settings according to speed limits, or the like, relative to the same vehicle system 100 traveling along the same route 114 for the same trip according to different operational settings (e.g., traveling at the track speed or other speed limit of the route 114).

The designated operational settings of the trip plan may include designated power settings, designated speeds, designated grades of the route or the like. The designated power settings of the vehicle system and the designated speeds of the vehicle system are directly related as a function of acceleration (designated power settings) and velocity (designated speed settings) according to the designated grades of the route at which the vehicle system is expecting to travel. The designated grades of the route include expected grade increases (e.g., hills, etc.) and/or decreases (e.g., valleys, etc.) that the vehicle system will travel. The designated power settings of the trip plan dictate how the vehicle power settings (e.g., throttle settings for acceleration of the vehicle system) are to be set at a given location along the route based on the designated grade of the route. For example, at a first location along the route, the designated grade may be expected to increase (e.g., the vehicle is expecting to travel up a hill). The vehicle system increases the designated power settings (e.g., the throttle settings increase) to continue traveling at the designated speed along the route according to the expected increasing designated grade of the route. Furthermore, at a second location along the route, the designated grade may be expected to decrease (e.g., the vehicle is expecting to travel down a hill). The vehicle system decreases the designated power settings (e.g., the throttle settings decrease) to continue traveling at the designated speed along the route according to the expected decreasing designated grade of the route.

A control system 110 (also referred to herein as a vehicle controller) controls operations of the vehicle 102 and/or vehicle system 100. The control system 110 represents hardware circuitry that includes and/or is connected with one or more processors (e.g., microprocessors, controllers, field programmable gate arrays, integrated circuits, etc.). The control system 110 can generate signals that are communicated to a propulsion system 112 of the vehicle 102 (e.g., motors, alternators, generators, etc.), or to any other systems. The control system 110 can include one or more input and/or output devices such as keyboard, an electronic mouse, stylus, microphone, touchscreen, other display screen, or the like, for communicating with an operator of the vehicle 102 or vehicle system 100. The control system 110 is operably connected with components of the off-board communication system 104. Additionally or alternatively, the control system 110 is operably connected with components that are disposed onboard the vehicle 102, onboard other vehicles of the vehicle system 100, and/or off-board the vehicle system 100 to control operation of the vehicle system 102. For example, the control system 110 may receive instructions from the EMS 106 that dictate how the vehicle system 100 is to move at different locations during a trip.

Additionally or alternatively, the off-board communication system 104 may communicate designated operational settings of a trip plan to the energy management system 106 onboard the vehicle 102, onboard other vehicles of the vehicle system 100, and/or off-board the vehicle system 100. Optionally, the communication system 104, or other communication source, may provide information to the energy management system 106 that is used by the EMS 106 to create the trip plan. Based on the communicated designated operational settings of the trip plan, the energy management system 106 can determine throttle settings, brake settings, or the like, of the vehicle 102 or vehicle system 100 as a function of time and/or distance along the route 114 in order to cause the vehicle system 100 to arrive at a designated location along the route 114 within a designated time period and/or at a designated time. The energy management system 106 may communicate throttle settings and/or brake settings, or the like, to the control system 110. The control system 110 generates signals, based on the communication from the EMS 106, that are communicated to the propulsion system 112 of the vehicle 102. The generated signals control operations of the vehicle system 100 and/or direct an operation of the vehicle system 100 in order to control movement according to the trip plan.

For example, the off-board communication system 104 may communicate designated operational settings of the trip plan, including designated power settings and designated speeds along the route, or the like, to the energy management system 106 of the vehicle 102. The designated power settings and the designated speeds of the trip plan are determined based on the designated grades of the route 114. Such changes of the designated grade along the route 114 may be positive grade changes (e.g., incline, increasing grade, etc.) or may be negative grade changes (e.g., decline, decreasing grade, etc.). For example, the designated grade along the route 114 may include an incline of route 114 along a distance X. The designated power setting would increase along the distance X due to the grade increase, resulting in increased designated speed along the distance X. Alternatively, the designated grade along the route 114 may include a decline of the route 114 along a distance Y. The designated power setting would decrease along the distance Y due to the grade decrease, resulting in decreased designated speed along the distance Y.

Figure 2:
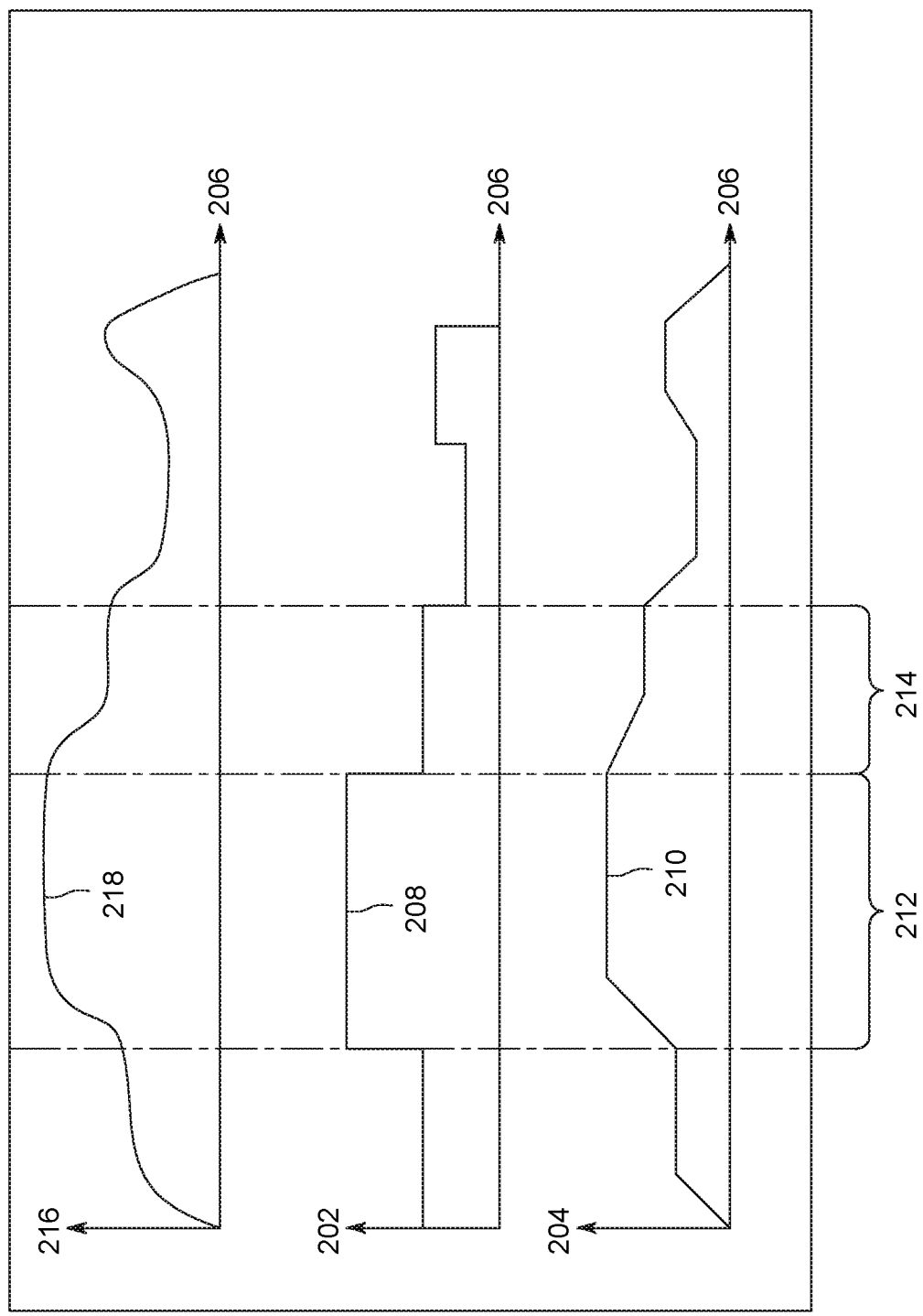
FIG. 2 is a schematic illustration of the designated operational settings according to one example of the inventive subject matter described herein.

FIG. 2 illustrates an example of how the designated power settings 208, designated speeds 210, and designated grades 218 interact along route 114 of the trip plan. The trip plan, as communicated by the off-board communication system 104 to the energy management system 106, includes designated operational settings of the vehicle 102 along the route. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218.

For example, a first segment A 212 of the trip illustrates the relationship between the designated power setting 208 of the trip plan, the designated speed 210 of the trip plan, and the designated grade 218 of the trip plan along the first segment A 212 of the trip plan. Along the first segment A 212, the designated speed 210 increases in order to accommodate the increasing designated grade 218 of the route 114. For example, a train travels along a route. Along the route at a given location the train needs to travel up a hill (e.g., an increasing grade) of the route. In order for the train to continue traveling at the same speed along the increasing grade, the train adjusts the operational settings by increasing the speed setting. Along the same first segment A 212, in order for the vehicle 102 to meet the increasing designated speed 210 due to the increasing designated grade 218, the designated power setting 208 also increases. For example, as the same train travels along the route, and at the given location the train travels up a hill (e.g., an increasing grade) of the route. In order for the train to continue traveling at the same speed along the increasing grade, the train adjusts the operational settings by increasing the throttle setting. The increase to the throttle setting (e.g., power setting) increases the speed of the train, thus demonstrating the relationship between the power setting and the speed setting of the train.

As another example, a second segment B 214 of FIG. 2 illustrates the relationship between the designated power setting 208 of the trip plan, the designated speed 210 of the trip plan, and the designated grade 218 of the trip plan along the second segment B 214 of the trip plan. Along the second segment B 214, the designated speed 210 decreases in order to accommodate the decreasing designated grade 218 of the route 114. For example, a train travels along a route. Along the route at a given location the train travels down a hill (e.g., a decreasing grade) of the route. In order for the train to continue traveling at the same speed along the decreasing grade, the train adjusts the operational settings by decreasing the speed setting. Along the same second segment B 214, in order for the vehicle 102 to meet the decreasing designated speed 210 due to the decreasing designated grade 218, the designated power setting 208 also decrease. For example, as the same train travels along the route, and at the given location the train travels down a hill (e.g., a decreasing grade) of the route. In order for the train to continue traveling at the same speed along the decreasing grade, the train adjusts the operational settings by decreasing the throttle setting. The decrease to the throttle setting (e.g., power setting) decreases the speed of the train, thus demonstrating the relationship between the power setting and the speed setting of the train.

However, the trip plan may be based on designated grades of the route 114 that includes one or more grade errors between the designated grades of the route and the actual grades of the route. There may be discrepancies in the designated grade of the route based on the differences between the designated power settings of the trip plan and the vehicle-controlled power settings. For example, a train travels along a route at a given location. At the given location of the route, the train is expecting to travel up a hill, or increasing grade. However, the actual increasing grade of the route might differ from the designated increasing grade of the route. For example, the actual increasing grade of the route might have an incline of 20 degrees, but the designated grade of the route might expect an incline of 35 degrees. The difference between the actual incline (20 degrees) and the designated incline (35 degrees) of the route is a grade error. The grade error could be a positive grade error or a negative grade error (described further below). The grade error between the designated grade and the actual grade of the route could be attributed to several factors including but not limited to miscalculated grades, environmental conditions, adhesion between one or more wheels of the vehicle and the route, vehicle cargo, damage to the route or vehicle system, etc.

FIGS. 3 through 6 provide different examples of how the energy management system 106 of the vehicle system 100 can modify the trip plan so that the vehicle 102 can travel at designated speeds and designated power settings. For example, as the vehicle 102 travels, the energy management system 106 may identify that the vehicle 102 may not be operating at the designated power setting of the trip plan resulting in the vehicle 102 not traveling at the designated speed of the trip plan. In response, the energy management system 106 can modify the trip plan as described below.

Figure 3:
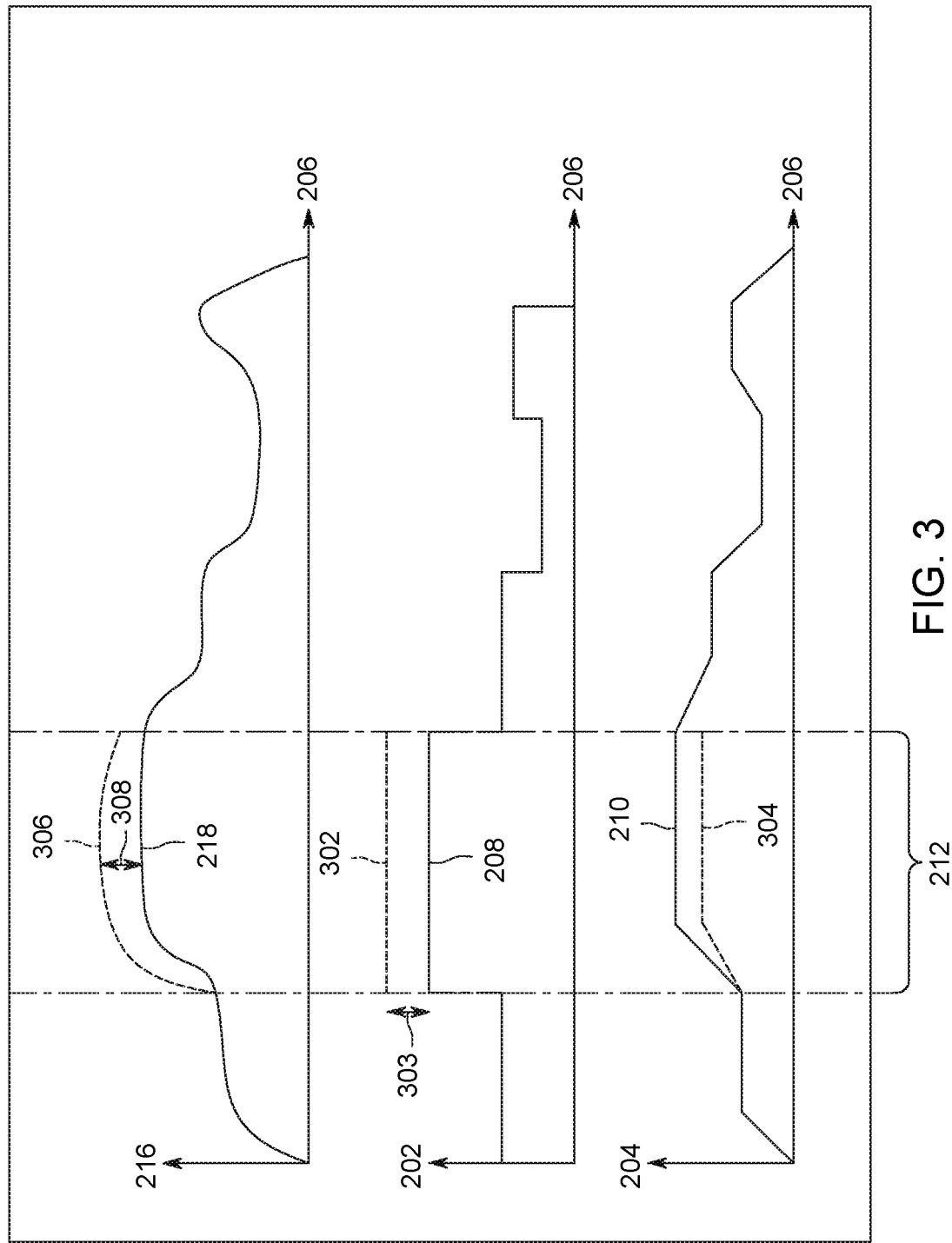
FIG. 3 is a schematic illustration of the identified operational settings differences according to one example of the inventive subject matter described herein.

FIG. 3 illustrates an example of a positive grade error 308 for a vehicle 102 traveling along a route 114 according to a trip plan along an increasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218. Demonstrated in FIG. 3 is one example of the energy management system 106 of the vehicle 102 identifying a positive grade error 308 between the designated grade 218 of the trip plan, and an actual grade 306 of the route along the first segment A 212. The positive grade error 308 along first segment A 212 results in a difference between the designated power settings 208 and vehicle-controlled power settings 302, as well as a difference between the designated speed 210 and an actual speed 304 of the vehicle 102. For example, along the first segment A 212, the vehicle 102 travels along an increasing grade. Along this increasing grade, however, there is the positive grade error 308 between the designated grade 218 and the actual grade 306. This positive grade error 308 results in the designated power settings too low for the vehicle 102 to travel at the designated speeds 210. For example, a train travels along a route. At a given location along the route, the train expects to travel up a hill (e.g., an increasing grade) at a degree of incline of 25 degrees from the horizontal. However, as the train travels up the hill, it is determined that the actual degree of incline is 40 degrees from the horizontal, resulting in a positive grade error of 15 degrees between the designated grade and the actual grade of the route (e.g., the actual up hill is steeper than expected). Because of this positive grade error, the train is not able to travel at the designated speed of 75 mph at this location along the route, resulting in the train traveling at an actual speed of 60 mph that is slower than the designated speed setting of the trip plan.

The energy management system 106 may identify this power setting difference 303 between the designated power settings 208 and the vehicle-controlled power settings 302. The energy management system 106 may increase the vehicle-controlled power settings 302 of the vehicle by an amount of correction value identified by the power setting difference 303 to make up for the positive grade error 308 of the route at the grade error location. The increase to the vehicle-controlled power setting 302 results in the increase to the actual speed 304 of the vehicle 102, causing the vehicle 102 to move towards the designated speeds 210 of the trip plan. For example, the train identifies that there is the positive grade error between the designated grade and the actual grade of the route. The train travels up a hill that has a greater increasing grade (e.g., the actual up hill is steeper than expected). Additionally, the train must also maintain the designated speed setting of 75 mph according to the trip plan. In order to keep the train traveling at the designated speed setting, the train increases the throttle settings by 25% (e.g., the vehicle-controlled power settings) in order for the train to increase the actual speed to 75 mph to reach the top of the hill while traveling at the designated speed setting.

Figure 4:
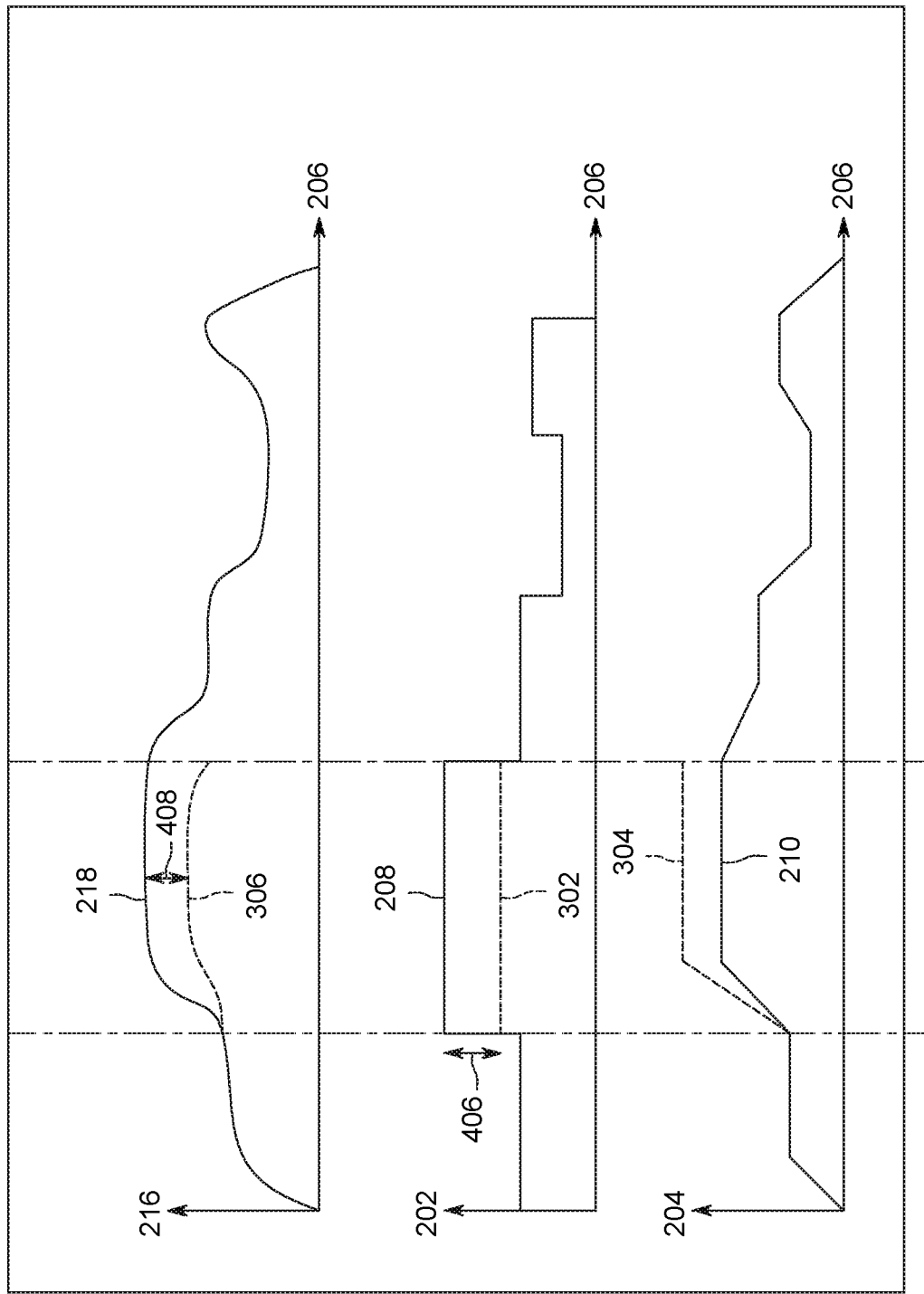
FIG. 4 is another schematic illustration of the identified operational settings differences according to one example of the inventive subject matter described herein.

FIG. 4 illustrates an example of a negative grade error 408 for the vehicle 102 traveling along the route 114 according to a trip plan along an increasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218 of the trip plan. Demonstrated in FIG. 4 is one example of the energy management system 106 of the vehicle 102 identifying a negative grade error 408 between the designated grade 218 of the trip plan, and the actual grade 306 of the route along the distance A 212. The negative grade error 408 along the first segment A 212 results in a difference between the designated power settings 208 and the vehicle-controlled power settings 302, as well as a difference between the designated speed 210 and the actual speed 304 of the vehicle 102. For example, along the first segment A 212, the vehicle 102 travels along an increasing grade. Along this increasing grade, however, there is the negative grade error 408 between the designated grade 218 and the actual grade 306. This negative grade error 408 results in the designated power settings 208 too high for the vehicle 102 to travel at the designated speeds 210. For example, a train travels along a route. At a given location along the route, the train expects to travel up a hill (e.g., an increasing grade) at a degree of incline of 40 degrees from the horizontal. However, as the train travels up the hill, it is determined that the actual degree of incline is 25 degrees from the horizontal, resulting in a negative grade error of −15 degrees between the designated grade and the actual grade of the route (e.g., the actual up hill is less steep than expected). Because of this negative grade error, the train is not able to travel at the designated speed of 75 mph at the location along the route, resulting in the train traveling at an actual speed of 90 mph that is faster than the designated speed setting of the trip plan.

The energy management system 106 may identify this power setting difference 406 between the designated power settings 208 and the vehicle-controlled power settings 302. The energy management system 106 may decrease the vehicle-controlled power settings 302 of the vehicle by an amount of correction value identified by the power setting difference 406 to make up for the negative grade error 408 of the route at the grade error location. The decrease to the vehicle-controlled power setting 302 results in the decrease to the actual speed 304 of the vehicle 102, causing the vehicle 102 to move towards the designated speeds 210 of the trip plan. For example, the train identifies that there is the negative grade error between the designated grade and the actual grade of the route. The train travels up a hill that has a lesser increasing grade (e.g., the actual up hill is less steep than expected). Additionally, the train must also maintain the designated speed setting of 75 mph according to the trip plan. In order to keep the train traveling at the designated speed setting, the train decreases the throttle settings by 20% (e.g., the vehicle-controlled power settings) in order for the train to decrease the actual speed to 75 mph to reach the top of the hill while traveling at the designated speed setting.

Figure 5:
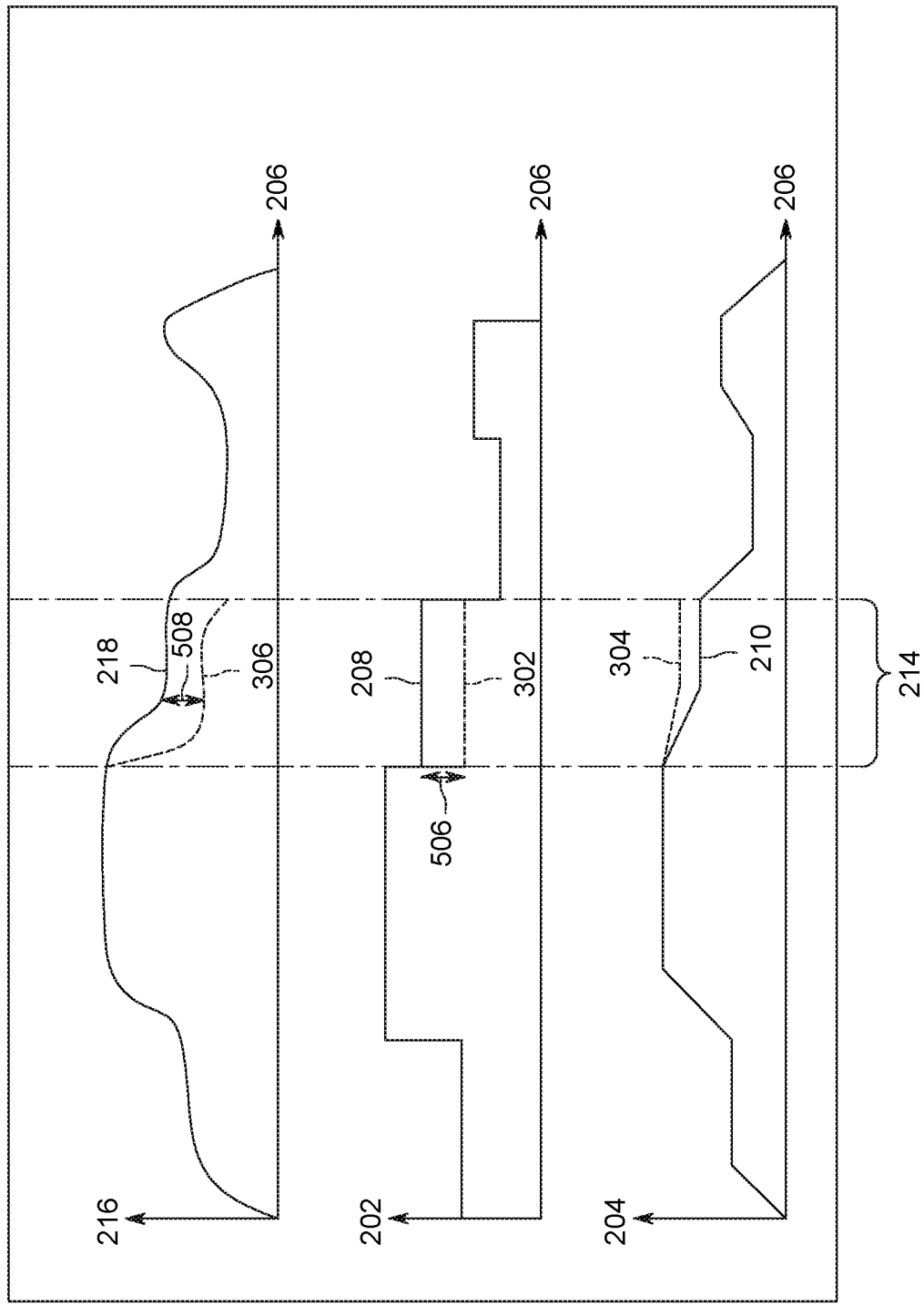
FIG. 5 is another schematic illustration of the identified operational settings differences according to one example of the inventive subject matter described herein.

FIG. 5 illustrates an example of a negative grade error 508 for a vehicle 102 traveling along a route 114 according to a trip plan along a decreasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218 of the trip plan. Demonstrated in FIG. 5 is one example of the energy management system 106 of the vehicle 102 identifying a negative grade error 508 between the designated grade 218 of the trip plan, and the actual grade 306 of the route along the second segment B 214. The negative grade error 508 along the second segment B 214 results in a difference between the designated power settings 208 and the vehicle-controlled power settings 302, as well as a difference between the designated speed 210 and the actual speed 304 of the vehicle 102. For example, along the second segment B 214, the vehicle 102 travels along a decreasing grade. Along this decreasing grade, however, there is the negative grade error 508 between the designated grade 218 and the actual grade 306 of the route. This negative grade error 508 results in the designated power settings 208 too high for the vehicle 102 to travel at the designated speeds 210. For example, a train travels along a route. At a given location along the route, the train expects to travel down a hill (e.g., a decreasing grade) at a degree of decline of −25 degrees from the horizontal. However, as the train travels down the hill, it is determined that the actual degree of decline is −40 degrees from the horizontal, resulting in a negative grade error of −15 degrees between the designated grade and the actual grade of the route (e.g., the actual downhill is steeper than expected). Because of this negative grade error, the train is not able to travel at the designated speed of 75 mph at the location along the route, resulting in the train traveling at an actual speed of 90 mph that is faster than the designated speed setting of the trip plan.

The energy management system 106 may identify this power setting difference 506 between the designated power settings 208 and the vehicle-controlled power settings 302. The energy management system 106 may decrease the vehicle-controlled power settings 302 of the vehicle by an amount of correction value identified by the power setting difference 506 to make up for the negative grade error 508 of the route at the grade error location. The decrease to the vehicle-controlled power setting 302 results in the decrease to the actual speed 304 of the vehicle 102, causing the vehicle 102 to move towards the designated speeds 210 of the trip plan. For example, the train identifies that there is the negative grade error between the designated grade and the actual grade of the route. The train travels down a hill that has a greater decreasing grade (e.g., the actual downhill is steeper than expected). Additionally, the train must also maintain the designated speed setting of 75 mph of the trip plan. In order to keep the train traveling at the designated speed setting, the train decreases the throttle settings by 20% (e.g., the vehicle-controlled power settings) in order for the train to decrease the actual speed setting to reach the bottom of the hill while traveling at the designated speed setting.

Figure 6:
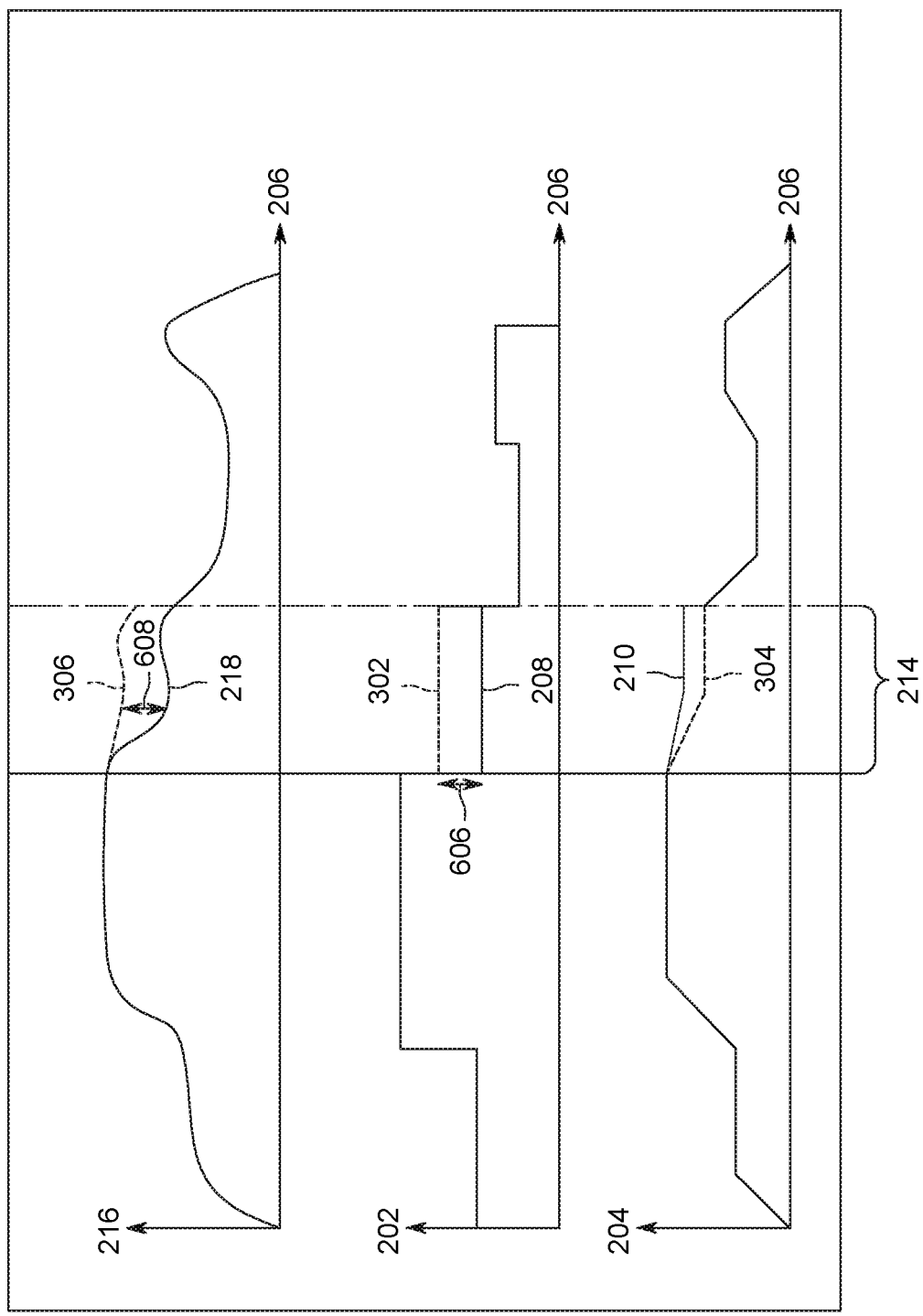
FIG. 6 is another schematic illustration of the identified operational settings differences according to one example of the inventive subject matter described herein.

FIG. 6 illustrates an example of a positive grade error 608 for a vehicle 102 traveling along a route 114 according to a trip plan along a decreasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218 of the trip plan. Demonstrated in FIG. 6 is one example of the energy management system 106 of the vehicle 102 identifying a positive grade error 608 between the designated grade 218 of the trip plan, and the actual grade 306 of the route along the second segment B 214. The positive grade error 608 along the second segment B 214 results in a difference between the designated power settings 208 and the vehicle-controlled power settings 302, as well as a difference between the designated speed 210 and the actual speed 304 of the vehicle 102. For example, along the second segment B 214, the vehicle 102 travels along a decreasing grade. Along this decreasing grade, however, there is the positive grade error 608 between the designated grade 218 and the actual grade 306 of the route. This positive grade error 608 results in the designated power settings 208 too low for the vehicle 102 to travel at the designated speeds 210. For example, a train travels along a route. At a given location along the route, the train expects to travel down a hill (e.g., a decreasing grade) at a degree of decline of −40 degrees from the horizontal. However, as the train travels down the hill, it is determined that the actual degree of decline is −25 degrees from the horizontal, resulting in a positive grade error of 15 degrees between the designated grade and the actual grade of the route (e.g., the actual downhill is less steep than expected). Because of this positive grade error, the train is not able to travel at the designated speed of 75 mph at the location along the route, resulting in the train traveling at an actual speed of 60 mph that is slower than the designated speed setting of the trip plan.

The energy management system 106 may identify this power setting difference 606 between the designated power settings 208 and the vehicle-controlled power settings 302. The energy management system 106 may increase the vehicle-controlled power settings 302 of the vehicle by an amount of correction value identified by the power setting difference 606 to make up for the positive grade error 608 of the route at the grade error location. The increase to the vehicle-controlled power setting 302 results in the increase to the actual speed 304 of the vehicle 102, causing the vehicle 102 to move towards the designated speeds 210 of the trip plan. For example, the train identifies that there is the positive grade error between the designated grade and the actual grade of the route. The train travels down a hill that has a lesser decreasing grade (e.g., the actual downhill is less steep than expected). Additionally, the train must also maintain the designated speed setting of 75 mph of the trip plan. In order to keep the train traveling at the designated speed setting, the train increases the throttle settings by 25% (e.g., the vehicle-controlled power settings) in order for the train to increase the actual speed setting to reach the bottom of the hill while traveling at the designated speed setting.

Alternatively or additionally, the power setting differences 303, 406, 506, and 606 along a route between the designated power settings of the trip plan and the vehicle-controlled power settings can also be caused by factors other than or in addition to grade errors along the route. For instance, power settings differences could be caused by environmental factors. As the vehicle travels along the route according to the designated operational settings of the trip plan, the designated operational settings of the trip plan may be predetermined to assume no environmental factors will impact the route of the vehicle. However, if the vehicle 102 is subjected to environmental factors such as rain, ice, wind, or the like, the vehicle might travel at actual speeds and vehicle-controlled power settings that differ from the trip plan designated speeds and designated power settings. If the vehicle 102 travels the route 114 subjected to one or more environmental facts (e.g., rain, ice, wind, etc.), the vehicle 102 might not travel at the designated speeds of the trip plan. Therefore, the energy management system 106 increases or decreases the vehicle-controlled power settings in order to cause the vehicle to move towards the designated speeds of the trip plan. Thus, the difference between the designated power settings and the vehicle controlled power settings might result in a power setting difference caused by environmental factors. For example, a train travels along a route. While in transit, the train is subjected to an ice storm. The ice storm and high winds from the storm slows the speed of the train, resulting in the train traveling at a speed that is less than the designated speed setting of the trip plan. In order to overcome the slower speed of the vehicle due to the impact of the weather, and to get the train to travel at the designated speed settings, the train increases the vehicle-controlled power settings. By increasing the vehicle-controlled power settings, the actual speed of the train increases. The increase of the actual speed of the train increases in order to match the designated speed setting of the trip plan.

Alternatively or additionally, the power setting differences 303, 406, 506, and 606 along a route between the designated power settings and the vehicle-controlled power settings can also be caused by adhesion between one or more wheels of the vehicle and the route. As the vehicle travels along the route according to the designated operational settings of the trip plan, the designated operational settings of the trip plan may be predetermined to assume no adhesion between one or more wheels of the vehicle and the route will impact the route of the vehicle 102. However, if the vehicle is subjected to adhesion between one or more wheels of the vehicle system 100 and the route, the vehicle might travel at actual speeds and vehicle-controlled power settings that differ from the trip plan designated speeds and designated power settings. If the vehicle 102 travels the route 114 subjected to one or more instances of adhesion between one or more wheels of the vehicle and the route, the vehicle might not be able to travel at the designated speeds of the trip plan. Therefore, the energy management system 106 increases or decreases the vehicle-controlled power settings in order to cause the vehicle 102 to move towards the designated speeds of the trip plan. Thus, the difference between the designated power settings and the vehicle controlled power settings might result in a power setting difference caused by an amount of adhesion between one or more wheels of the vehicle and the route. For example, a train travels along a route. While in transit, four wheels of the vehicle are subjected to unexpected amounts of adhesion between the wheels and a track of the route. This unexpected adhesion slows the speed of the train, making the train travel at an actual speed that is less than the designated speed setting of the trip plan. In order to overcome the slower speed due to the unexpected adhesion between the wheels and the track, and to get the train to travel at the designated speed settings, the train increases the vehicle-controlled power settings. By increasing the vehicle-controlled power settings, the actual speed of the train increases in order to match the designated speed setting of the trip plan.

Alternatively or additionally, the power setting differences 303, 406, 506, and 606 along a route between the designated power settings and the vehicle-controlled power settings can also be caused by differences between designated vehicle cargo and actual vehicle cargo. As the vehicle travels along the route according to the designated operational settings of the trip plan, the designated operational settings of the trip plan may be predetermined to assume the vehicle will be carrying a designated cargo. However, if the vehicle is carrying an actual cargo that differs from the designated cargo of the vehicle, the vehicle might travel at actual speeds and vehicle-controlled power settings that differ from the trip plan designated speeds and designated power settings. If the vehicle travels the route carrying a cargo that differs from the designated cargo, the vehicle might not be able to travel at the designated speeds. Therefore, the energy management system 106 increases or decreases the vehicle-controlled power settings in order to cause the vehicle to move towards the designated speeds of the trip plan. Thus, the difference between the designated power settings and the vehicle controlled power settings might result in a power setting difference caused by differences between a designated cargo and actual vehicle cargo. For example, a train travels along a route. While in transit, the train is carrying a cargo load of 50 tons. However, the designated settings of the trip plan anticipated the train carrying a cargo load of 100 tons. This unexpected cargo load difference results in the train traveling at an actual speed that is faster than the designated speed setting of the trip plan. In order to overcome the faster speed due to the cargo load difference, and to get the train to travel at the designated speed settings, the train decreases the vehicle-controlled power settings. By decreasing the vehicle-controlled power settings, the actual speed of the train reduces in order to match the designated speed setting of the trip plan.

The energy management system 106 of the vehicle 102 identifies the power setting differences 303, 406, 506, and 606 of FIGS. 3, 4, 5, and 6, respectively, and furthermore determines an anomaly count of the instances when the designated power settings are different than the vehicle-controlled power settings along the route. The anomaly count of the instances of power setting differences is identified when the power setting difference value exceeds a predetermined designated threshold margin value. For example, in FIG. 3, the energy management system 106 increases the vehicle-controlled power settings 302 to make up for the positive grade error 308 between the designated grade 218 and the actual grade 306. If the power setting difference 303 exceeds the predetermined designated threshold margin, the error is recorded within the anomaly count. For example, a train travels along a route. At a location along the route, the train travels up a hill (e.g., an increasing grade). The actual grade of the hill is 45 degrees from the horizontal. However, the designated grade of the trip plan was expected to be 25 degrees from the horizontal. The difference between the actual grade of the route and the designated grade of the trip plan results in a 20 degree positive grade error. Because of this 20 degree positive grade error, the train travels at an actual speed of 60 mph, which is less than the designated speed setting of 75 mph of the trip plan. In order to keep the train traveling at the designated speed setting of 75 mph, the train increases the throttle settings by 25% (e.g., the vehicle-controlled power settings) in order to make the train increase the actual speed to 75 mph. The energy management system 106 has a predetermined designated threshold margin of a 10% difference between the designated power settings of the trip plan, and the actual vehicle-controlled power settings of the train. The 25% throttle setting increase exceeds the predetermined 10% threshold power setting difference. Because the 25% increase exceeds the 10% threshold, this instance is recorded by the energy management system as an error, and is recorded as an anomaly count.

Furthermore, the energy management system 106 communicates the anomaly count of the identified power setting differences, the identified positive grade errors and the identified negative grade errors to the off-board communication system 104. This responsive communication of the one or more differences between the designated trip plan operational settings and the actual vehicle-controlled settings allows for systematic scheduled inspections of the route at error locations. The responsive communication provides data to modify the trip plan as the vehicle is in transit in order to minimize the difference between the designated operational settings and the actual vehicle operational settings. Furthermore, the responsive communication provides data to update the trip plan for future vehicle systems traveling along the route.

The anomaly count of the power setting differences is additionally used to determine a route health index. The route health index is determined by reviewing the number of anomaly count instances of a route. The route health index is compared to a predetermined health index range in order to understand the extent of damage to the route. For example, a train travels along the route. During transit, the energy management system 106 identifies an anomaly count of 36. The anomaly count identifies 36 instances of power settings differences and positive and/or negative grade errors at specific locations along the route. The predetermined health index range identifies a route having a good health for anomaly count values of 0 to 25, and a bad health for anomaly count values of greater than 25. The example anomaly count of 36 identifies the route to be in bad health.

Figure 7:
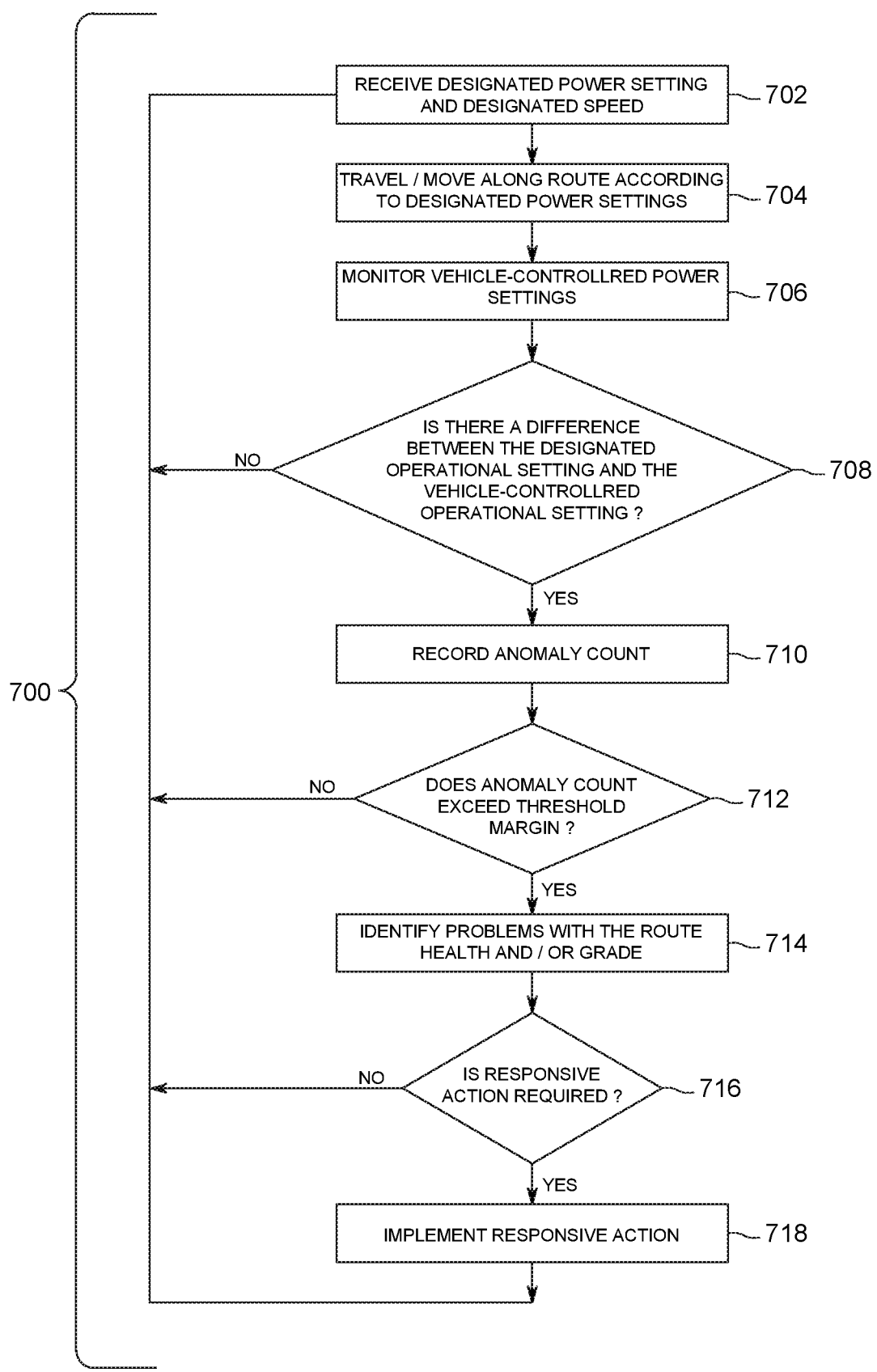
FIG. 7 illustrates a flowchart of a method for identifying operational setting differences according to one example of the inventive subject matter described herein.

FIG. 7 illustrates a flowchart of one embodiment of a method 700 for identifying operational setting differences between the designated operational settings of the trip plan and the vehicle-controlled operational settings of the route. At 702, a data signal is received by the vehicle system 100. The signal may be sent from one or more devices off-board the vehicle system, or may be generated on-board the vehicle system. The signal includes designated operational settings at which the vehicle 102 is to travel along a route 114 according to a determined trip plan. The designated operational settings include designated power settings and designated speeds at which the vehicle should operate along a route according to a designated grade.

At 704, the vehicle travels or moves along the route for a rolling window predefined increment of distance (e.g., 2-miles, 5-miles, 10-miles, any other value of distance, etc) according to the designated power settings of the trip plan. At 706, the energy management system 106 monitors the designated operational settings in view of the how the vehicle 102 actually travels along the route. The EMS 106 monitors the vehicle-controlled operational settings, including vehicle-controlled power settings and actual speeds.

At 708, a determination is made to whether there is a difference between the designated operational settings of the trip plan and the actual vehicle operational settings. Specifically, such differences could be between the designated power settings and the vehicle-controlled power settings; between the designated speed and the actual speed at which the vehicle travels; between the designated grade of the route and the actual grade of the route; or the like. If it is determined no differences exist between the designated operational settings of the trip plan and the actual vehicle controlled operational settings along the predefined increment of distance (e.g., 2-miles, 5-miles, 10-miles, any other value of distance, etc.) along the route, flow of the method 700 proceeds towards 702. Alternatively, flow of the method 700 proceeds towards 710 if it is determined that a difference does exist between the designated operational settings of the trip plan and the actual vehicle controlled operational settings. At 710, the determined difference is recorded as an anomaly count. Flow of the method 700 then continues to 712.

At 712, a determination is made whether the anomaly count difference between the designated operational setting of the trip plan and the actual vehicle controlled operation setting exceeds a predetermined threshold margin value. If the difference between the designated operational setting of the trip plan and the actual vehicle controlled operation setting does not exceed the predetermined threshold margin value, flow of the method 700 proceeds towards 702. Alternatively, flow of the method 700 proceeds towards 714 if it is determined that the differences between the designated operation setting of the trip plan and the actual vehicle controlled operation setting does exceed the predetermined threshold margin value.

At 714, identification of a problem of the route health and/or grade is made. The problem is identified by one or more differences between the designated operational settings of the trip plan and the actual vehicle controlled operation settings along the predefined increment of distance of the route. Identified differences may be categorized as positive grade errors or negative grade errors. Alternatively or additionally, identified differences may be used to determine the route health index as detailed above. Alternatively or additionally, identified differences may be categorized as power setting differences between the designated power settings and the vehicle-controlled power settings. Alternatively or additionally, identified differences may be categorized as non-anticipated weather conditions (e.g., rain, wind, ice, etc) that may prevent the vehicle from traveling/moving at the designated operational settings of the trip plan. Alternatively or additionally, identified differences may be categorized as non-anticipated route adhesion between one or more wheels of the vehicle and the route. Alternatively or additionally, identified differences may be categorized as non-anticipated cargo loads.

At 716, a determination is made to whether a responsive action to the identified problem with the route grade and/or health is required. The responsive action could include scheduling an inspection of the route at the grade error location. Alternatively or additionally, the responsive action could be to modify the designated operational settings of the trip plan during movement of the vehicle along the route. Alternatively or additionally, the responsive action could be to permanently update the one or more designated operational settings of the trip plan for future vehicle systems traveling along the route. Such updates could include one or more of changes to the designated power settings, changes to the designated speeds, changes to the designated grades, or the like. If it is determined that a responsive action is not required, flow of the method 700 proceeds towards 702. Alternatively, flow of the method proceeds towards 718 if it is determined that responsive action is required.

At 718, the responsive action identified at 716 is implemented. Flow of the method 700 then proceeds towards 702 to review a second rolling window predefined increment of distance (e.g., 2-miles, 5-miles, 10-miles, any other value of distance, etc) along the route. The method 700 continues until the vehicle has traveled the complete distance of the route.

In an embodiment, the system includes one or more processors configured to determine vehicle-controlled power settings of a vehicle as the vehicle moves along a route according to a trip plan. The trip plan dictating designated speeds and designated power settings of the vehicle at different locations along the route. The trip plan is based on designated grades of the route. The vehicle-controlled power settings are controlled to cause the vehicle to move toward the designated speeds of the trip plan. The one or more processors are configured to identify differences between the designated power settings of the trip plan and the vehicle-controlled power settings at which the vehicle is controlled to cause the vehicle to move toward the designated speeds of the trip plan. The one or more processors also are configured to determine discrepancies in the designated grades of the route based on the differences between the designated power settings of the trip plan and the vehicle-controlled power settings.

Optionally, the one or more processors of the system are configured to identify the one or more differences between the designated grades and the actual grades by determining whether the one or more differences between the designated grades and the actual grades are positive errors or negative errors. The one or more processors also are configured to determine an amount of correction to at least one of the designated grades that will reduce the one or more differences between the designated grades and the actual grades. The one or more processors are configured to determine an anomaly count of the differences between the designated power settings of the trip plan and the vehicle-controlled power settings, and to identify an error in a route database that stores the designated grades of the route responsive to the anomaly count exceeding a designated threshold margin.

Optionally, one or more processors also are configured to determine a route health index based on the one or more differences between the designated grades of the route and the actual grades of the route. The route health index is representative of an extent of damage to the route. The one or more processors of the system are configured to obtain environmental data representative of an ambient condition outside of the vehicle and to determine whether the one or more differences between the designated power settings of the trip plan and the vehicle-controlled power settings are caused by the ambient condition based on the environmental data.

Optionally, the one or more processors of the system are configured to determine an amount of adhesion between one or more wheels of the vehicle and the route and to determine whether the one or more differences between the designated power settings of the trip plan and the vehicle-controlled power settings are caused by the amount of adhesion. The one or more processors of the system are configured to determine a difference between designated vehicle cargo and actual vehicle cargo and to determine whether the one or more differences between the designated power settings of the trip plan and the vehicle-controlled power settings are caused by the difference between the designated vehicle cargo and the actual vehicle cargo.

Optionally, the one or more processors, responsive to determining the one or more differences between the designated power settings of the trip plan and the vehicle-controlled power settings, are configured to one or more of schedule inspection of the route, modify the trip plan during movement of the vehicle along the route, or update at least one of the designated grades of the route based on the one or more differences between the designated power settings of the trip plan and the vehicle-controlled power settings. The system is configured to control the vehicle for movement along the route based at least in part on the one or more differences between the designated grades of the route and actual grades of the route that are determined.

In an embodiment, the method includes determining vehicle-controlled power settings of a vehicle as the vehicle moves along a route according to a trip plan. The trip plan dictating designated speeds and designated power settings of the vehicle at different locations along the route. The trip plan is based on designated grades of the route. The vehicle-controlled power settings are controlled to cause the vehicle to move toward the designated speeds of the trip plan. The method includes identifying differences between the designated power settings of the trip plan and the vehicle-controlled power settings at which the vehicle is controlled to cause the vehicle to move toward the designated speeds of the trip plan. The method includes determining discrepancies in the designated grades of the route based on the differences between the designated power settings of the trip plan and the vehicle-controlled power settings.

Optionally, the method also includes identifying the one or more differences between the designated grades and the actual grades including determining whether the one or more differences between the designated grades and the actual grades are positive errors or negative errors. The method further determines an amount of correction to at least one of the designated grades that will reduce the one or more differences between the designated grades and the actual grades. The method determines an anomaly count of the differences between the designated power settings of the trip plan and the vehicle-controlled power settings and identifies an error in a route database that stores the designated grades of the route responsive to the anomaly count exceeding a designated threshold margin.

Optionally, the method includes determining a route health index based on the one or more differences between the designated grades of the route and the actual grades of the route, the route health index representative of an extent of damage to the route. The method also includes obtaining environmental data representative of an ambient condition outside of the vehicle and determining whether the one or more differences between the designated power settings of the trip plan and the vehicle-controlled power settings are caused by the ambient condition based on the environmental data. The method includes determining an amount of adhesion between one or more wheels of the vehicle and the route and determining whether the one or more differences between the designated power settings of the trip plan and the vehicle-controlled power settings are caused by the amount of adhesion. The method also includes determining a difference between designated vehicle cargo and actual vehicle cargo and determining whether the one or more differences between the designated power settings of the trip plan and the vehicle-controlled power settings are caused by the difference between the designated vehicle cargo and the actual vehicle cargo.

Optionally, the method further includes, responsive to determining the one or more differences between the designated power settings of the trip plan and the vehicle-controlled power settings, one or more of scheduling inspection of the route; modifying the trip plan during movement of the vehicle along the route; or updating at least one of the designated grades of the route based on the one or more differences between the designated power settings of the trip plan and the vehicle-controlled power settings. The method also includes controlling the vehicle for movement along the route based at least in part on the one or more differences between the designated grades of the route and actual grades of the route that are determined.

In an embodiment, the system includes a vehicle controller configured to determine vehicle-controlled power settings of a vehicle as the vehicle moves along a route according to a trip plan. The trip plan dictating designated speeds and designated power settings of the vehicle at different locations along the route. The trip plan is based on designated grades of the route. The vehicle-controlled power settings are controlled to cause the vehicle to move toward the designated speeds of the trip plan, wherein the vehicle controller also is configured to identify differences between the designated power settings of the trip plan and the vehicle-controlled power settings at which the vehicle is controlled to cause the vehicle to move toward the designated speeds of the trip plan. The vehicle controller is also configured to determine a route health index based on discrepancies in the designated grades of the route based on the differences between the designated power settings of the trip plan and the vehicle-controlled power settings, the route health index representative of an extent of damage to the route.

Optionally, the system includes the vehicle controller configured to determine one or more differences between the designated grades of the route and actual grades based on the differences between the designated power settings of the trip plan and the vehicle-controlled power settings.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second,", and "third," etc. are used merely as labels, and are not intended to impose numerical requirements on their objects. Further, the limitations of the following claims are not written in means-plus-function format and are not intended to be interpreted based on 35 U.S.C. 112(f), unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, communication unit, control system, etc) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element of a plurality of elements having a particular property may include additional such elements not having that property.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   one or more processors configured to determine vehicle-controlled power settings of a vehicle as the vehicle moves along a route according to a trip plan, the trip plan dictating designated speeds and designated power settings of the vehicle at different locations along the route, the trip plan based on designated grades of the route, the vehicle-controlled power settings are controlled to cause the vehicle to move toward the designated speeds of the trip plan based on an amount of correction between the vehicle-controlled power settings and the designated power settings, the one or more processors also configured to identify differences between the designated power settings of the trip plan and the vehicle-controlled power settings at which the vehicle is controlled to cause the vehicle to move toward the designated speeds of the trip plan, wherein the amount of correction between the vehicle-controlled power settings and the designated power settings is configured to decrease as the vehicle moves toward the designated speeds of the trip plan,
   wherein the one or more processors also are configured to determine discrepancies in the designated grades of the route based on the differences between the designated power settings of the trip plan and the vehicle-controlled power settings, and
   wherein the one or more processors also are configured to automatically change the vehicle-controlled power settings without operator intervention to cause the vehicle to move toward the designated speeds of the trip plan based on the identified differences between the designated power settings of the trip plan and the vehicle-controlled power settings.

2. The system of claim 1, wherein the one or more processors are configured to identify the one or more differences between the designated grades and the actual grades by determining whether the one or more differences between the designated grades and the actual grades are positive errors or negative errors.

3. The system of claim 1, wherein the one or more processors also are configured to determine an amount of correction to at least one of the designated grades that will reduce the one or more differences between the designated grades and the actual grades.

4. The system of claim 1, wherein the one or more processors are configured to determine an anomaly count of the differences between the designated power settings of the trip plan and the vehicle-controlled power settings, and to identify an error in a route database that stores the designated grades of the route responsive to the anomaly count exceeding a designated threshold margin.

5. The system of claim 1, wherein the one or more processors are configured to obtain environmental data representative of an ambient condition outside of the vehicle; and to determine whether the one or more differences between the designated power settings of the trip plan and the vehicle-controlled power settings are caused by the ambient condition based on the environmental data.

6. The system of claim 1, wherein the one or more processors are configured to determine whether the one or more differences between the designated power settings of the trip plan and the vehicle-controlled power settings are caused by adhesion between one or more wheels of the vehicle and the route.

7. The system of claim 1, wherein the one or more processors are configured to determine a difference between designated vehicle cargo and actual vehicle cargo; and to determine whether the one or more differences between the designated power settings of the trip plan and the vehicle-controlled power settings are caused by the difference between the designated vehicle cargo and the actual vehicle cargo.

8. The system of claim 1, wherein the one or more processors, responsive to determining the one or more differences between the designated power settings of the trip plan and the vehicle-controlled power settings, are configured to one or more of:
  schedule inspection of the route;
  modify the trip plan during movement of the vehicle along the route; or
  update at least one of the designated grades of the route based on the one or more differences between the designated power settings of the trip plan and the vehicle-controlled power settings.

9. The system of claim 1, wherein the system is configured to control the vehicle for movement along the route based at least in part on the one or more differences between the designated grades of the route and actual grades of the route that are determined.

10. A method comprising:
  determining vehicle-controlled power settings of a vehicle as the vehicle moves along a route according to a trip plan, the trip plan dictating designated speeds and designated power settings of the vehicle at different locations along the route, the trip plan based on designated grades of the route, the vehicle-controlled power settings are controlled to cause the vehicle to move toward the designated speeds of the trip plan based on an amount of correction between the vehicle-controlled power settings and the designated power settings;
  identifying differences between the designated power settings of the trip plan and the vehicle-controlled power settings at which the vehicle is controlled to cause the vehicle to move toward the designated speeds of the trip plan, wherein the amount of correction between the vehicle-controlled power settings and the designated power settings is configured to decrease as the vehicle moves toward the designated speeds of the trip plan;
  determining discrepancies in the designated grades of the route based on the differences between the designated power settings of the trip plan and the vehicle-controlled power settings; and
  automatically changing the vehicle-controlled power settings without operator intervention to cause the vehicle to move toward the designated speeds of the trip plan based on the identified differences between the designated power settings of the trip plan and the vehicle-controlled power settings.

11. The method of claim 10, wherein identifying the one or more differences between the designated grades and the actual grades including determining whether the one or more differences between the designated grades and the actual grades are positive errors or negative errors.

12. The method of claim 10, further comprising determining an amount of correction to at least one of the designated grades that will reduce the one or more differences between the designated grades and the actual grades.

13. The method of claim 10, further comprising:
  determining an anomaly count of the differences between the designated power settings of the trip plan and the vehicle-controlled power settings; and
  identifying an error in a route database that stores the designated grades of the route responsive to the anomaly count exceeding a designated threshold margin.

14. The method of claim 10, further comprising:
  obtaining environmental data representative of an ambient condition outside of the vehicle; and
  determining whether the one or more differences between the designated power settings of the trip plan and the vehicle-controlled power settings are caused by the ambient condition based on the environmental data.

15. The method of claim 10, further comprising:
  determining whether the one or more differences between the designated power settings of the trip plan and the vehicle-controlled power settings are caused by adhesion between one or more wheels of the vehicle and the route.

16. The method of claim 10, further comprising:
  determining a difference between designated vehicle cargo and actual vehicle cargo; and
  determining whether the one or more differences between the designated power settings of the trip plan and the vehicle-controlled power settings are caused by the difference between the designated vehicle cargo and the actual vehicle cargo.

17. The method of claim 10, further comprising, responsive to determining the one or more differences between the designated power settings of the trip plan and the vehicle-controlled power settings, one or more of:
  scheduling inspection of the route;
  modifying the trip plan during movement of the vehicle along the route; or updating at least one of the designated grades of the route based on the one or more differences between the designated power settings of the trip plan and the vehicle-controlled power settings.

18. The method of claim 10, further comprising controlling the vehicle for movement along the route based at least in part on the one or more differences between the designated grades of the route and actual grades of the route that are determined.

19. A system comprising:
one or more processors configured to determine vehicle-controlled power settings of a vehicle as the vehicle moves along a route according to a trip plan, the trip plan dictating designated speeds and designated power settings of the vehicle at different locations along the route, the trip plan based on designated grades of the route, the vehicle-controlled power settings are controlled to cause the vehicle to move toward the designated speeds of the trip plan based on an amount of correction between the vehicle-controlled power settings and the designated power settings, the one or more processors also configured to identify differences between the designated power settings of the trip plan and the vehicle-controlled power settings at which the vehicle is controlled to cause the vehicle to move toward the designated speeds of the trip plan, wherein the amount of correction between the vehicle-controlled power settings and the designated power settings is configured to decrease as the vehicle moves toward the designated speeds of the trip plan,
wherein the one or more processors also are configured to determine discrepancies in the designated grades of the route based on the differences between the designated power settings of the trip plan and the vehicle-controlled power settings,
wherein the one or more processors also are configured to automatically change the vehicle-controlled power settings without operator intervention to cause the vehicle to move toward the designated speeds of the trip plan based on the identified differences between the designated power settings of the trip plan and the vehicle-controlled power settings,
wherein the one or more processors are configured to obtain environmental data representative of an ambient condition outside of the vehicle, and to determine whether the one or more differences between the designated power settings of the trip plan and the vehicle-controlled power settings are caused by the ambient condition based on the environmental data,
wherein the one or more processors are configured to determine whether the one or more differences between the designated power settings of the trip plan and the vehicle-controlled power settings are caused by adhesion between one or more wheels of the vehicle and the route, and
wherein the one or more processors are configured to determine a difference between designated vehicle cargo and actual vehicle cargo; and to determine whether the one or more differences between the designated power settings of the trip plan and the vehicle-controlled power settings are caused by the difference between the designated vehicle cargo and the actual vehicle cargo.

20. The system of claim 19, wherein the one or more processors also are configured to determine an amount of correction to at least one of the designated grades that will reduce the one or more differences between the designated grades and the actual grades.

* * * * *